Patented Nov. 2, 1926.

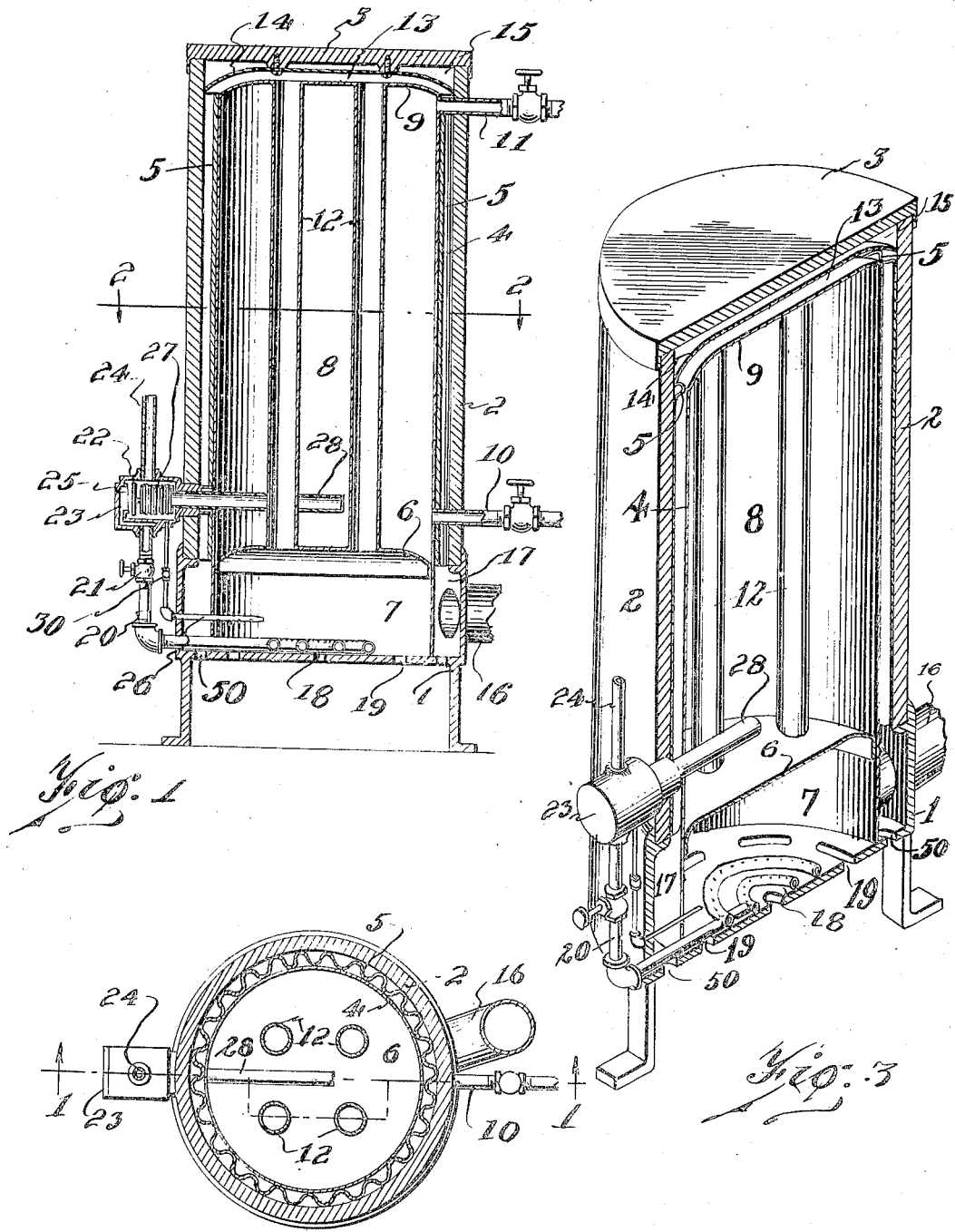

1,605,621

UNITED STATES PATENT OFFICE.

FRANK W. SHUELL, OF DETROIT, MICHIGAN.

WATER HEATER.

Application filed December 6, 1919. Serial No. 342,994.

This invention relates to water heaters and a primary object is to provide a comparatively simple and inexpensive construction of a character to absorb and utilize the greatest percentage of heat units evolved. A further object is to provide a construction utilizing a burner and a control device actuated by the temperature of the water of the heater to control the gas flow to the burner whereby a practically uniform temperature of the water is maintained. A further feature of the invention resides in the construction of the heat absorbing walls and arrangement of the passageways for the heated air and gas from the burner whereby a comparatively large area of metal is subjected to the influence of the heated air and gas in small compass. These objects and various novel features of the invention are hereinafter more fully described and claimed and a device showing the preferred form of my invention is shown in the accompanying drawings in which—

Fig. 1 is a vertical section taken on line 1—1 of Fig. 2 of a water heater embodying my invention.

Fig. 2 is a cross section taken on line 2—2 of Fig. 1.

Fig. 3 is a perspective view partly in section showing the interior arrangement of the parts.

In the preferred form of construction I provide a base member 1 preferably supported on legs as shown on which is supported the outer casing 2. This casing is provided with a cover member 3 therefor. Within this outer casing and spaced therefrom is an inner shell or casing 4, both the shells 2 and 4 being preferably cylindrical in form, and between this inner and outer shell is placed a corrugated member 5 as shown clearly in Fig. 2 engaging both the inner and outer shells and providing a multiplicity of flues through which the heated air may pass as is hereinafter shown. Interiorly of the inner shell is provided a flue sheet 6 near the lower end providing a heating chamber 7 above which is the water chamber 8. This inner shell is provided with an upper flue sheet 9 and has valved inlet and outlet conduits 10 and 11 as shown. Between the flue sheet 6 and the upper flue sheet 9 are a series of vertical flues 12 open to the chamber 7 and to a chamber 13 formed between the flue sheet 9 and the cover 3. For this latter purpose I provide on the cover a shield member or plate 14 spaced from the cover proper providing a dead air space 15 between the shield and the cover preferably curved as shown to deflect the hot gases, passing upward through the flues from the heat chamber, into the space between the shells. The base member 1 is provided with a large outlet conduit 16 for the discharge of the heated gases and this conduit 16 leads into the base to a chamber 17 formed between the inner shell and the base member and this chamber 17 is open to the space between the inner and outer shells in which is positioned the corrugated member 5. The heated gases thus are made to pass upward from the burner 18 through the vertical flues 12 and thence downward between the inner and outer shells where practically the remainder of the heat is absorbed by the corrugated member and transmitted through the wall of the inner shell to the water therewithin and this movement of heated gases in contact with the walls of the inner shell permits the gases to give up the greater proportion of its heat.

As heretofore stated, the burner 18 is positioned within the chamber 7 and the base member 1 is provided with several apertures 19 to supply the burner with air which becomes heated and passes upward through the flues as before stated. This burner is preferably a gas burner supplied through a conduit 20 having a manually operable valve therein by means of which it may be fully closed. An automatic valve member 22 is provided in a chamber 23 positioned exteriorly of the outer casing into which the gas supply conduit 24 leads. This chamber is provided with a valve seat 25 at one end and the valve 22, if moved into contact with the seat, prevents gas from passing to the burner and when withdrawn from the seat permits a flow of gas thereto. A pilot light or burner 26 is connected by means of a conduit with the valve chamber 23 and back of the valve 22 and thus at all times is supplied with gas and not controlled by the valve 22 which therefore controls only the flow of gas to the burner proper. This valve member is supported on a metallic bellows 27, hollow in form, and to which is connected a closed tube 28 extending into the inner shell and subject to the heat of the water therein. This tube and bellows is partially filled with a volatile fluid such that, upon becoming heated, a vapor is produced in the closed tube and bellows which tends to lengthen the bellows and moves the valve 22 to closed position and on decrease of temperature and condensation of the gaseous vapors, the bellows contracts and the valve is withdrawn from its seat and again supplies gas to the burner which is ignited by the pilot. Thus, with the valve 21 open and the valve 30 in the conduit to the pilot burner open and the burner 18 ignited, the water in the inner chamber 8 is heated and, when heated to such extent as to volatize the liquid in the control valve tube, the valve 22 is closed against its seat shutting off the supply of gas to the burner. This permits the water to cool and, when cooled, to a sufficient extent the bellows 27 contracts and again permits a flow of gas to the burner which is ignited by the pilot. It is thus to be seen that the operation of the device is automatic and will maintain the water at practically uniform temperature. It is further to be seen that the construction also permits of the ready cleaning of the flues by removal of the cover member 14.

The corrugated shell 5 occupies the space between the inner and outer shells and lies in the body of flow of heated gases absorbing the heat therefrom tending to retain the same within the heater. The corrugated shell is a convenient means of providing a heat absorbing surface of metal which is directly in contact with the inner shell and to a greater or less extent tends to transmit heat to the shell and a greater part of the heat units produced by the burner are thus retained.

By the positioning of the exhaust flue adjacent the bottom of the channel surrounding the inner casing, the heat from the burner in the heating or combustion chamber 7 is utilized to a great extent due principally to the large area of the walls of the corrugated spacing device and shell of the casing exposed to the heated gases. Furthermore, the heat is conserved after the burner has been turned out through operation of the control valve as the heated gases within the conduits therefor in the device do not readily flow through the exhaust tube as would be the case if the exhaust tube opened directly to the top of the heat conduits.

I preferably provide a series of openings 50 in the base at the bottom of the heat channel between the outer and inner shells. These openings are materially less in area than the area of the exhaust flue 16 in cross section and have a double purpose as follows—These openings permit a back flow of gases of combustion from the flue in the case of a down draft in the chimney and thus prevent backing up of the gases of combustion into the combustion chamber tending to prevent combustion therein. Further, in all cases of excessive draft these openings tend to check the same thus preventing too rapid an exhaust of the gases of combustion from the heater, the openings therefore functioning to delay the discharge of the exhaust gases and thereby permitting an absorption of the heat units before discharge. With the exhaust flue supplied partially by the openings 50, the "pull" of the draft that is applied to the channel between the inner and outer shells is reduced and the burner therefore must produce sufficient exhaust gases to force the same upward to the top of the water chamber at 13 and downward to influence of the exhaust flue 16. Thus, with low flame and a small amount of exhaust gases being produced the chimney draft is lessened due to the small volume of heated gases but with increased flame and an increased flow of exhaust gases the draft is increased and this may be increased due to production of the gaseous vapor of the burner to such an extent that the demand of the exhaust flue is practically met by the exhaust gases. With such production of gaseous vapor there is practically no tendency for colder air to flow upward through the openings 50.

Having thus fully described my invention, what I claim and desire to secure by Letters Patent of the United States is—

1. A water heater comprising cylindrical inner and outer casings in spaced relation providing a passageway for gases of combustion therebetween, the inner casing being adapted to contain water, a heating chamber at the bottom of the inner casing, an exhaust chamber surrounding the same into which the passageway between the casings discharges, flues extending through the water chamber from the heating chamber and discharging to the cylindrical passageway at the top, a cylindrical corrugated member contacting adjacent walls of the inner and outer casing and holding the same in spaced relation, and a discharge flue in the side of the exhaust chamber.

2. A water heater comprising cylindrical outer and inner casings in spaced relation, a longitudinally corrugated sheet metal spacing member positioned between the casings and in contact therewith, a heat chamber at the bottom of the inner casing, said inner casing being adapted to contain water, the inner casing having passageways therethrough for the heated gases in communication with the passageway between the casings at the top, and an exhaust flue in communication with the said passageway between the casings at the bottom.

3. A water heater comprising inner and outer casings of similar form in cross section, a longitudinally corrugated, sheet-metal, spacing member positioned between the casings and in contact therewith, the inner casing being adapted to hold water, a heat chamber formed at the bottom of the inner casing and the inner casing having passageways for heated gases discharging to the top of the space between the casings, and an exhaust flue in communication with the said space at the bottom.

4. A water heater comprising inner and outer casings of similar form in cross section in spaced relation, the inner casing providing a water chamber, a heating chamber at the bottom of the said inner casing, flues extending through the water chamber from the top of the said heat chamber and discharging to the space between the two casings at the top, a corrugated metal member interposed between the casings and contacting adjacent walls of each casing providing a series of passageways for the heated gases, a base supporting the two casings and providing an exhaust chamber about the heating chamber at the bottom into which the space between the casings opens, said base having means supporting the same above the supporting surface and further having apertures at the bottom some of which open to the exhaust chamber and some of which open to the heat chamber, and a gas burner in the heating chamber.

5. A water heater comprising inner and outer cylindrical casings in spaced relation, a base supporting the same, a cover extending over the outer casing, the inner casing terminating below the cover member, the inner chamber being supported centrally of the base and being provided with a combustion chamber at the bottom and a water chamber thereabove, a series of heat flues extending from the combustion chamber through the water chamber and opening through the top of the inner case, a deflecter member supported on the under side of the cover and spaced therefrom deflecting the gases passing upward through the flues to the upper end of the space between the inner and outer casings, the said base having openings in the bottom to atmosphere some of which open directly into the combustion chamber and some of which open directly to the exhaust chamber thereabout and directly beneath the space between the casings, an exhaust flue opening into the exhaust chamber between the said openings and at the bottom of the cylindrical space, and a corrugated metal member in the said space contacting both the inner and outer casings.

6. A water heater comprising inner and outer casings in spaced relation providing a chamber therebetween open at the top, both said casings having closed upper ends, a base supporting the said casings, said base being provided with an outer vertical wall at the upper edge of which the outer casing is supported, and a bottom horizontal wall on which the inner casing is supported, said bottom wall having a series of apertures some of which open to the inner casing and some of which open to between the inner casing and the vertical wall of the base, said inner casing having a transverse wall above the bottom thereof providing a heat chamber, a burner in the said chamber, flues extending from the said transverse wall through the upper end closure of the inner casing, a deflector member thereabove deflecting the heated gases to the space between the inner and outer chambers at the top, an exhaust flue opening through the vertical wall of the base and in communication with the space between the casings, and a longitudinally corrugated member insertible in the space between the casings spacing the same and providing a means for absorbing heat from the exhaust gases as they pass through the channels provided by the corrugations.

In testimony whereof, I sign this specification.

FRANK W. SHUELL.